United States Patent
Chang et al.

(10) Patent No.: US 8,254,723 B2
(45) Date of Patent: Aug. 28, 2012

(54) SYSTEM AND METHOD FOR EXTRACTING BOUNDARY ELEMENTS OF AN OBJECT

(75) Inventors: Chih-Kuang Chang, Taipei Hsien (TW); Xin-Yuan Wu, Shenzhen (CN); Hua Huang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 898 days.

(21) Appl. No.: 12/353,259

(22) Filed: Jan. 14, 2009

(65) Prior Publication Data

US 2010/0021068 A1 Jan. 28, 2010

(30) Foreign Application Priority Data

Jul. 25, 2008 (CN) .......................... 2008 1 0303082

(51) Int. Cl.
*G06K 9/36* (2006.01)
(52) U.S. Cl. .................. 382/285; 382/199; 382/201
(58) Field of Classification Search .................. 356/485, 356/489, 490, 511; 382/199, 201, 285
See application file for complete search history.

(56) References Cited

U.S. PATENT DOCUMENTS

| 6,476,803 | B1 * | 11/2002 | Zhang et al. | 345/419 |
| 2005/0018901 | A1 * | 1/2005 | Kaufmann et al. | 382/154 |
| 2005/0168460 | A1 * | 8/2005 | Razdan et al. | 345/419 |
| 2008/0294401 | A1 * | 11/2008 | Tsin et al. | 703/8 |

OTHER PUBLICATIONS

Savchenko et al., The Shannon Entropy-Based Node Placement for Enrichment and Simplification of Meshes, 2007, Retrieved from Internet on Mar. 16, 2012. Retrieved from Internet<URL:www.springerlink.com/index/dnjr437920h37425.pdf>.*

* cited by examiner

*Primary Examiner* — Gregory F Cunningham
(74) *Attorney, Agent, or Firm* — Altis Law Group, Inc.

(57) ABSTRACT

A computer-implemented method for extracting boundary elements of an object includes receiving measurement data of a point cloud of the object and a maximum edge length of a triangle to form a triangular mesh surface of the point cloud, constructing the triangular mesh surface, and extracting boundary points from the triangular mesh surface. The method further includes grouping the boundary points according to a vector relationship between one boundary point and each of the other boundary points, fitting each group of boundary points to an appropriate boundary characteristic. The appropriate boundary characteristic may be output to a storage system.

20 Claims, 10 Drawing Sheets

SYSTEM AND METHOD FOR EXTRACTING BOUNDARY ELEMENTS OF AN OBJECT

BACKGROUND

1. Technical Field

Embodiments of the present disclosure relate to systems and methods for image measurement of objects, and more particularly to a system and method for extracting boundary elements of an object to be measured.

2. Description of Related Art

Product quality has long been one of the most important factors in maintaining a typical manufacturing enterprise's competitiveness. Ways of improving the quality of products is an important ongoing pursuit of such enterprises. It is essential to verify the correctness of an object before batch production of the object begins.

In recent years, image measuring machines have been used to obtain a point cloud of an object by scanning a large number of points on a surface of the object, processing the point cloud, subsequently extracting boundary elements including boundary points and boundary characteristics of the object, in order to form a profile image of the object. The quality of the object may be determined by checking whether the profile image and an actual image of the object can be aligned. But the method cannot align the two images efficiently, especially for an irregular object with special positions, such as an irregular object having multiple layers of disordered point clouds.

BRIEF DESCRIPTION OF THE DRAWINGS

FIG. 4-1 and FIG. 4-2 are schematic diagrams illustrating an exemplary method of fitting exemplary boundary points to an appropriate boundary characteristic;

DETAILED DESCRIPTION OF CERTAIN INVENTIVE EMBODIMENTS

All of the processes described below may be embodied in, and fully automated via, software code modules executed by one or more general purpose computers or processors. The code modules may be stored in any type of computer-readable medium or other computer storage device. Some or all of the methods may alternatively be embodied in specialized computer hardware.

Figure 1:
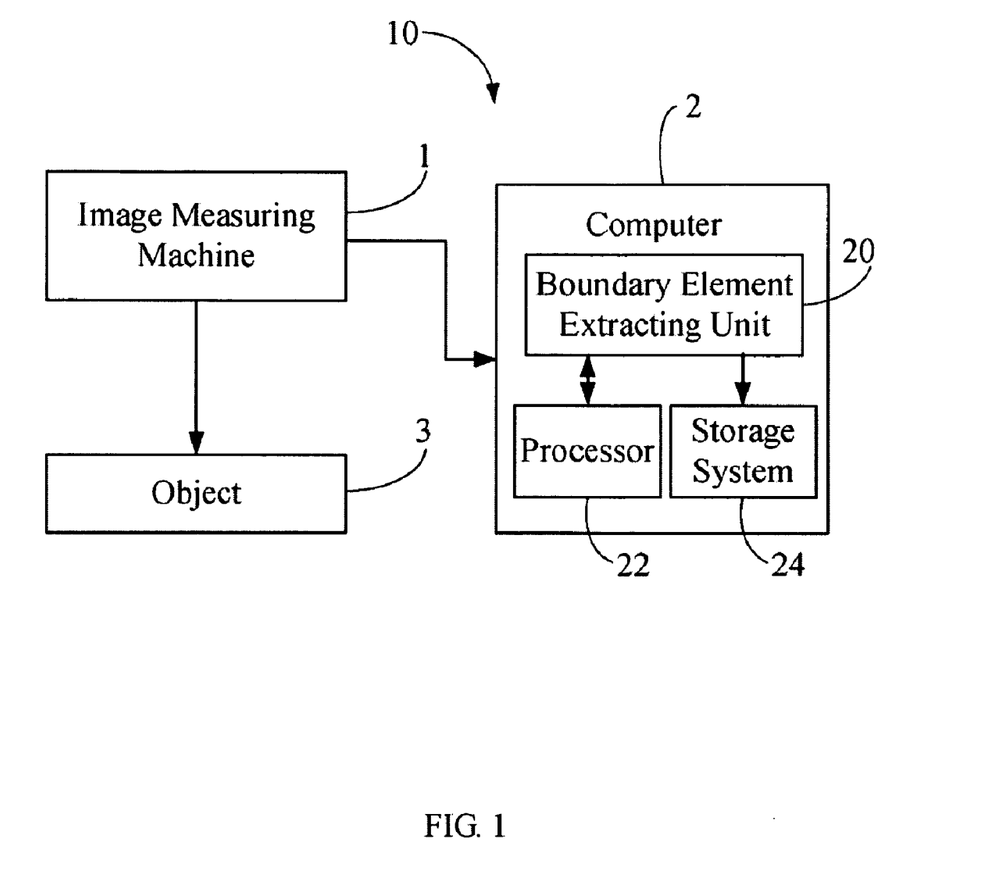
FIG. 1 is a block diagram of one embodiment of a system for extracting boundary elements of an object.

FIG. 1 is a block diagram of one embodiment of a system for extracting boundary elements of an object (hereinafter, "the system 10"). In one embodiment, the boundary elements may include a plurality of boundary points and boundary characteristics of the object. The system 10 includes an image measuring machine 1, and a computer 2 electrically connected to the image measuring machine 1. The image measuring machine 1 typically includes a platform, and an object 3 laid on the platform. The computer 2 comprises a boundary element extracting unit 20, at least one processor 22, and a storage system 24. The boundary element extracting unit 20 is configured for receiving measurement data of a point cloud of the object 3 (hereinafter, "point cloud data") obtained by the image measuring machine 1, extracting the boundary elements of the object 3 based on the point cloud data. In the embodiment, the point cloud data may include coordinates of each point, an identification (ID) of each point, and a total number of points in the point cloud.

Figure 2:
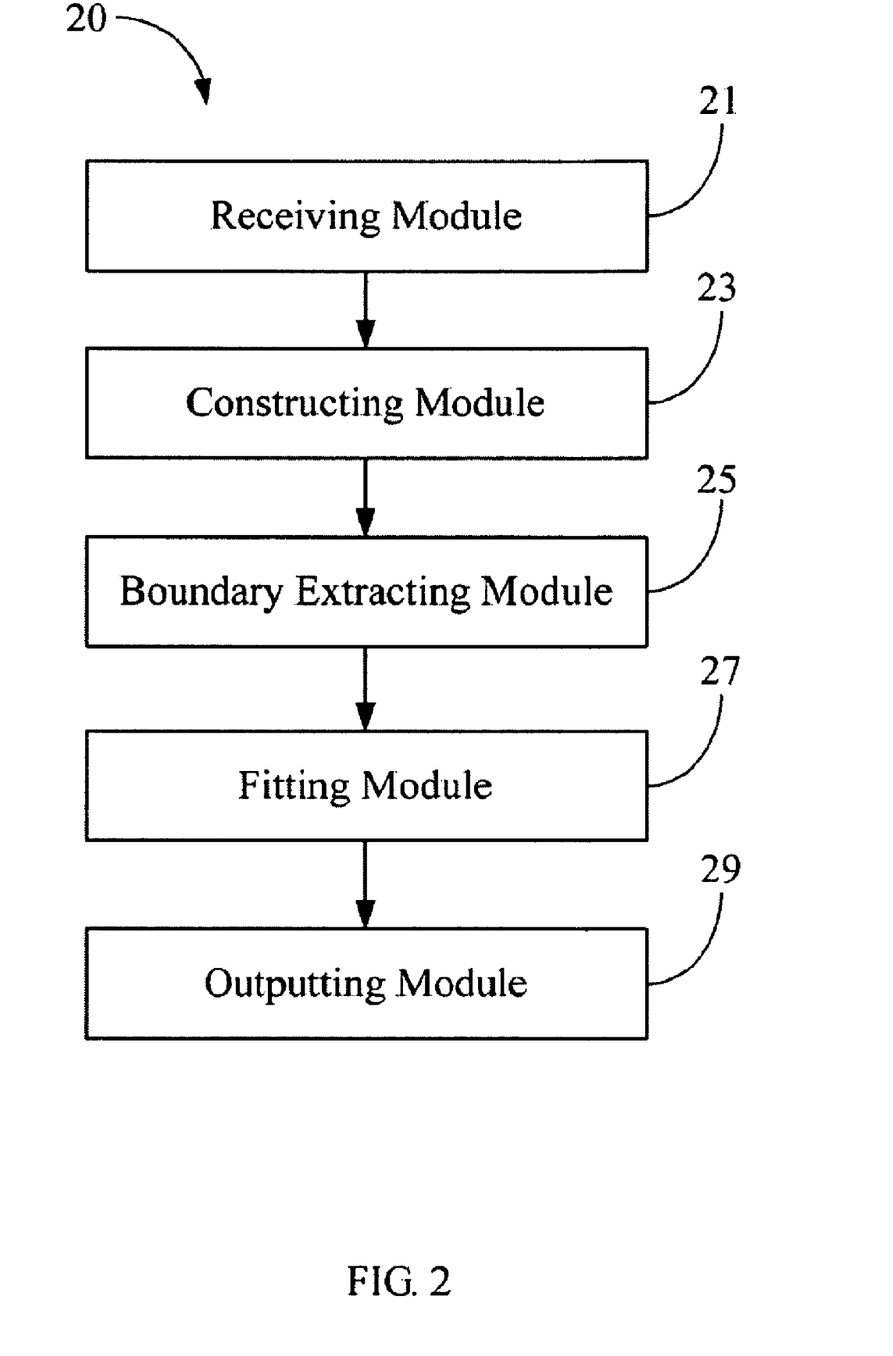
FIG. 2 is a block diagram of one embodiment of a boundary element extracting unit of FIG. 1.

FIG. 2 is a block diagram of one embodiment of the boundary element extracting unit 20 of FIG. 1. The boundary element extracting unit 20 may include a plurality of instructions that can be executed by the processor 22 of the computer 2. In one embodiment, the boundary element extracting unit 20 may include a receiving module 21, a constructing module 23, a boundary extracting module 25, a fitting module 27, and an output module 29.

The receiving module 21 is configured for receiving the point cloud data obtained from the image measuring machine 1 and a maximum edge length of a triangle to form a triangular mesh surface of the point cloud. In the embodiment, the maximum edge length is input by a user, and may equal an average value of distances between two adjacent points of the point cloud according to the point cloud data.

The constructing module 23 is configured for constructing the triangular mesh surface of the point cloud according to the maximum edge length.

The boundary extracting module 25 is configured for extracting boundary points from the triangular mesh surface.

The fitting module 27 is configured for grouping the boundary points according to a vector relationship between one boundary point and each of the other boundary points, and fitting each group of boundary points to an appropriate boundary characteristic. The appropriate boundary characteristic may be a circle, a beeline, or a cylinder, for example.

The outputting module 29 is configured for outputting the appropriate boundary characteristic to the storage system 24.

Figure 3:
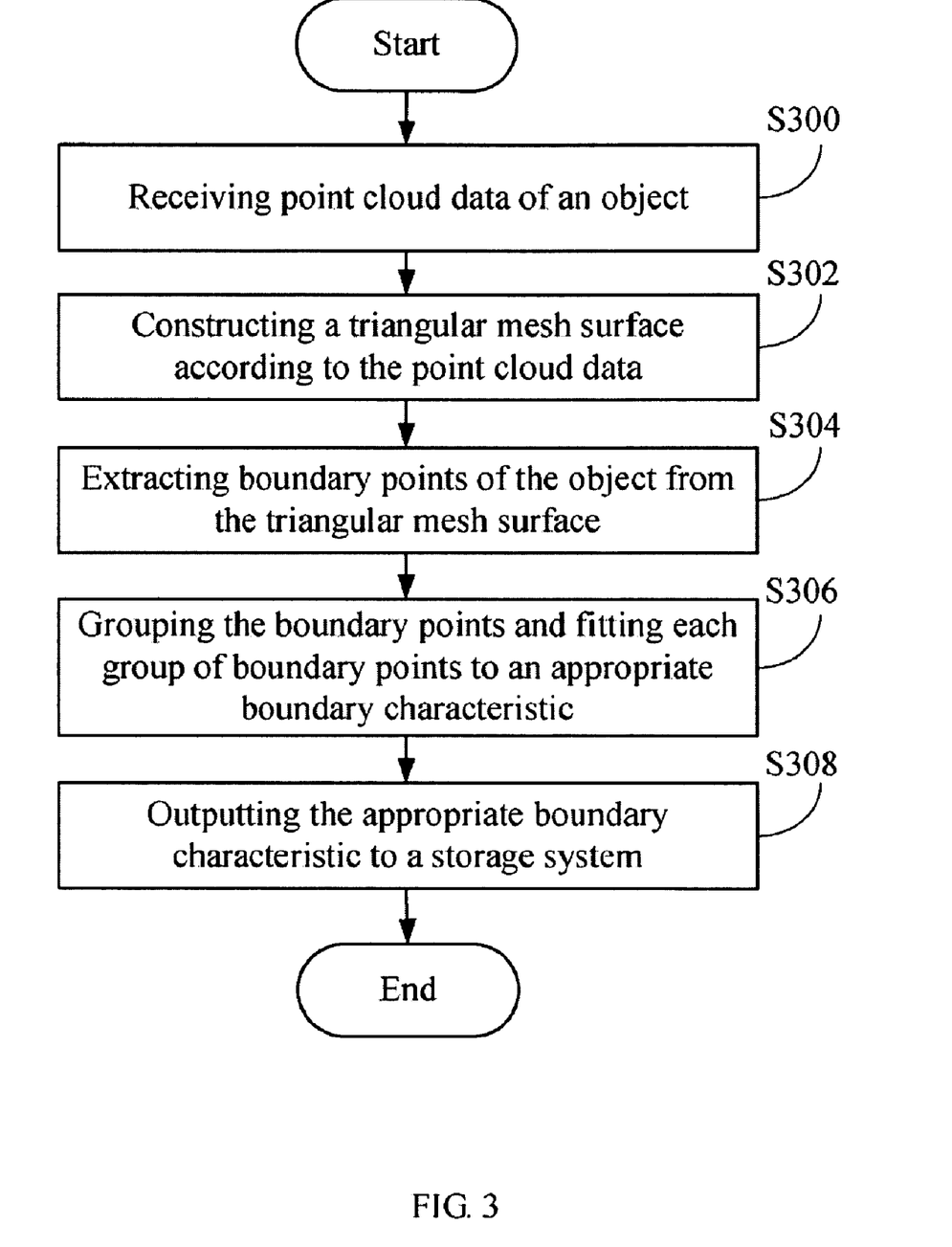
FIG. 3 is a flowchart of one embodiment of a method for extracting boundary elements of an object.

FIG. 3 is a flowchart of one embodiment of a method for extracting boundary elements of the object 3. Depending on the embodiment, additional blocks may be added, while others removed, and the ordering of the blocks may also be changed.

In block S300, the receiving module 21 receives the point cloud data of the object 3 obtained from the image measuring machine 1, and receives a maximum edge length of a triangle to form a triangular mesh surface of the point cloud input by a user.

Figure 5:
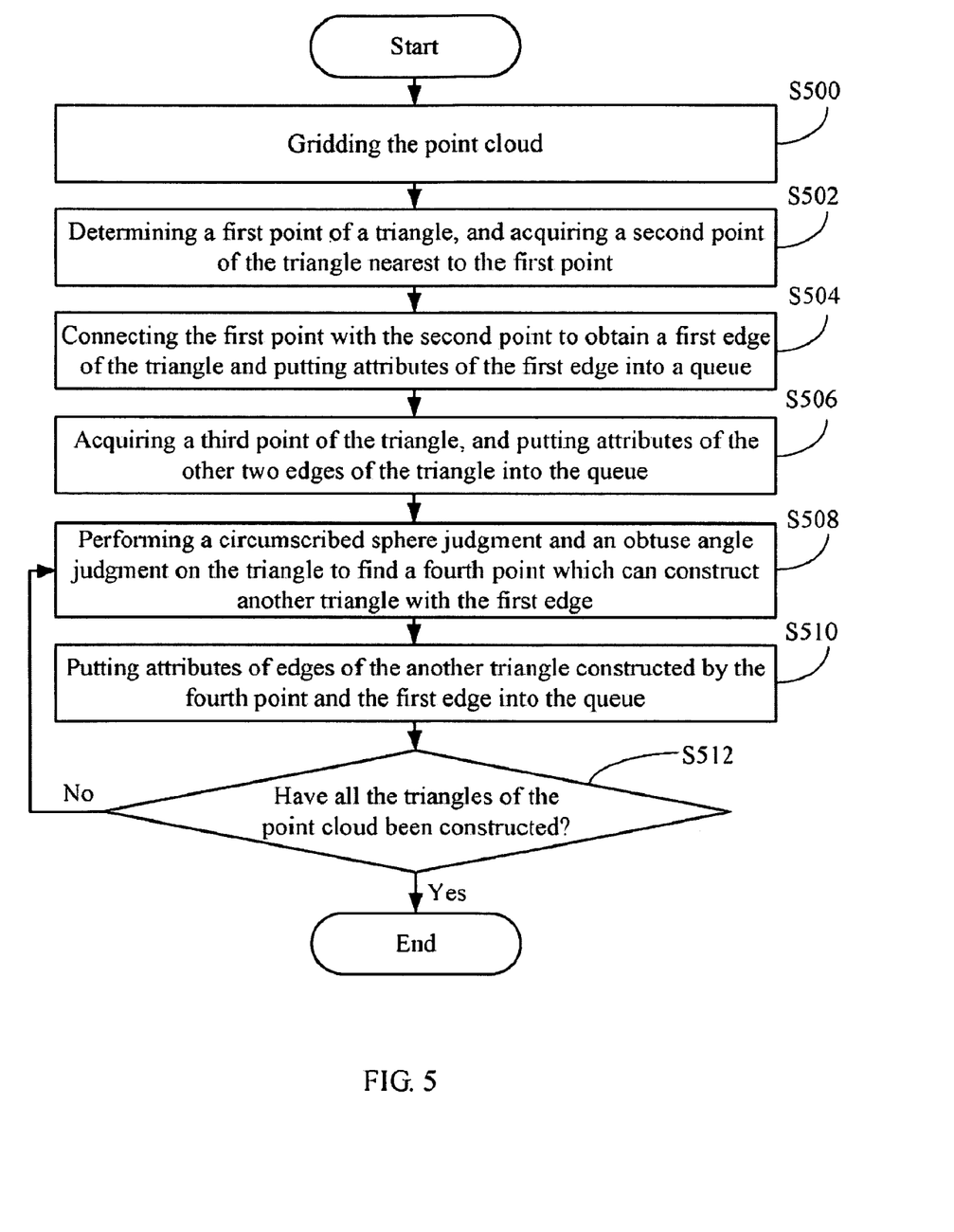
FIG. 5 is one block of FIG. 3 in detail, namely constructing a triangular mesh surface of point cloud.

In block S302, the constructing module 23 constructs the triangular mesh surface of the point cloud according to the maximum edge length and the point cloud data (details are described in FIG. 5).

Figure 7:
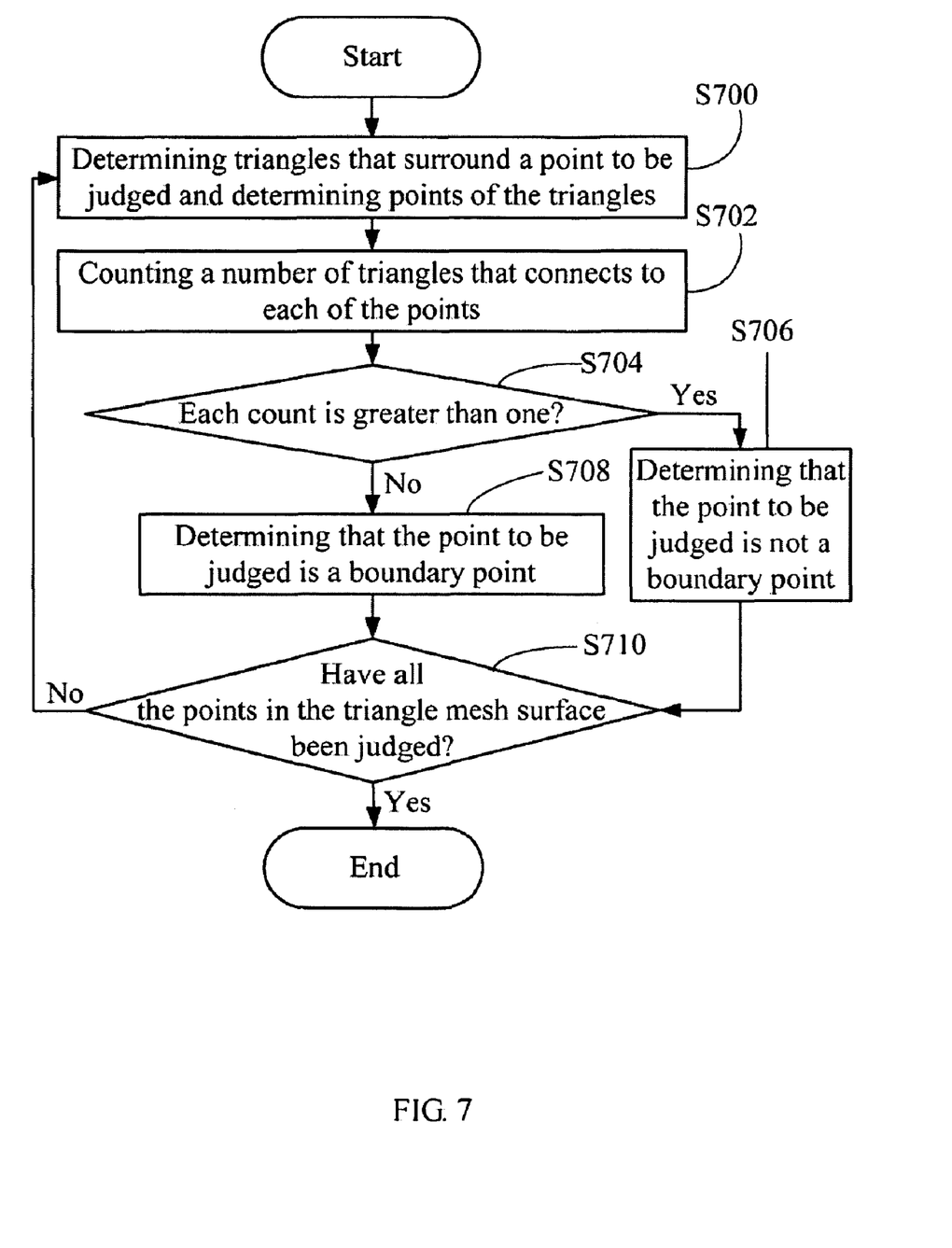
FIG. 7 is one block of FIG. 3 in detail, namely extracting boundary points from the triangular mesh surface.

In block S304, the boundary extracting module 25 extracts boundary points of the object 3 from the triangular mesh surface (details are described in FIG. 7).

Figure 10:
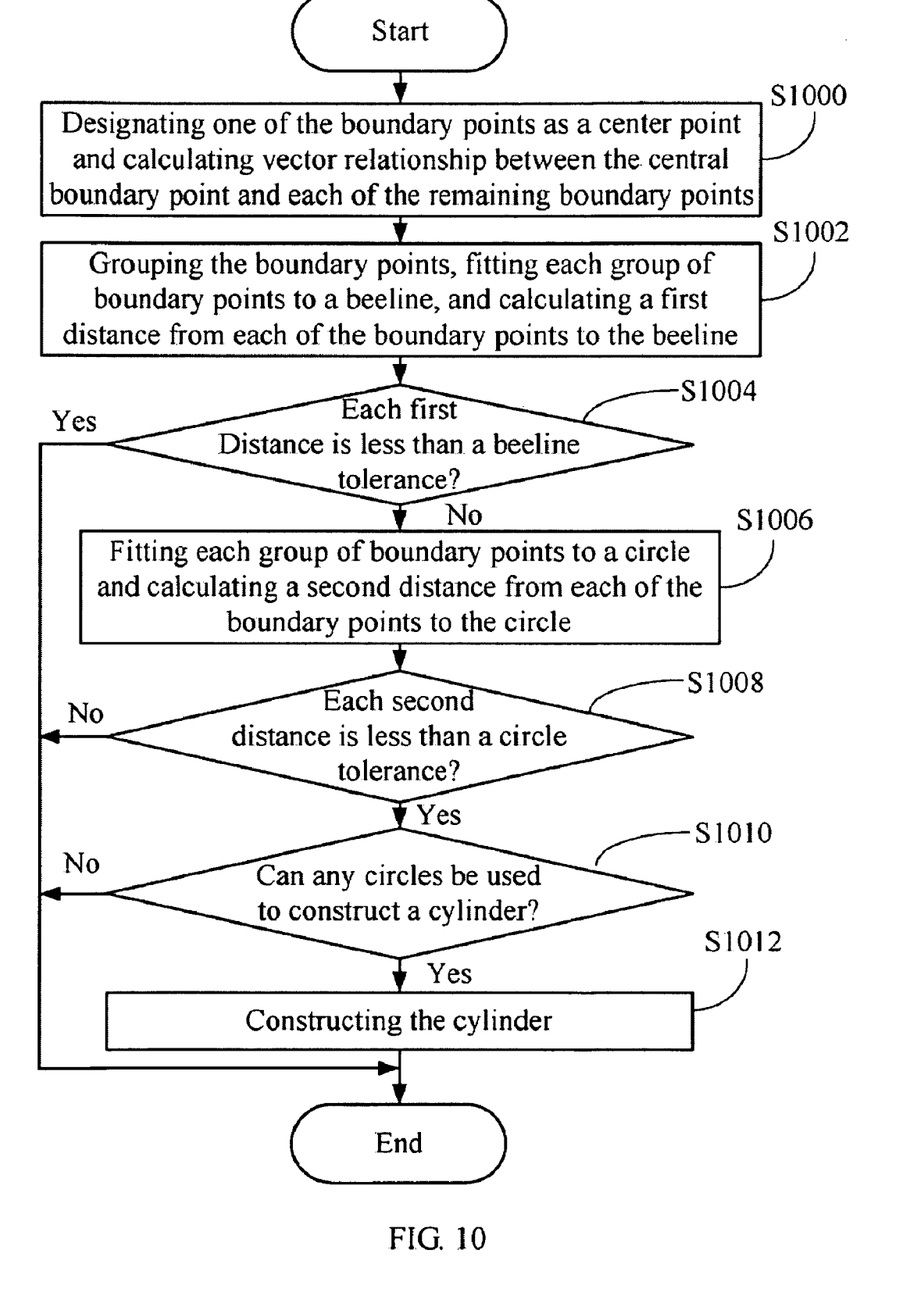
FIG. 10 is one block of FIG. 3 in detail, namely fitting each group of the boundary points to an appropriate boundary characteristic.
Figure 41:
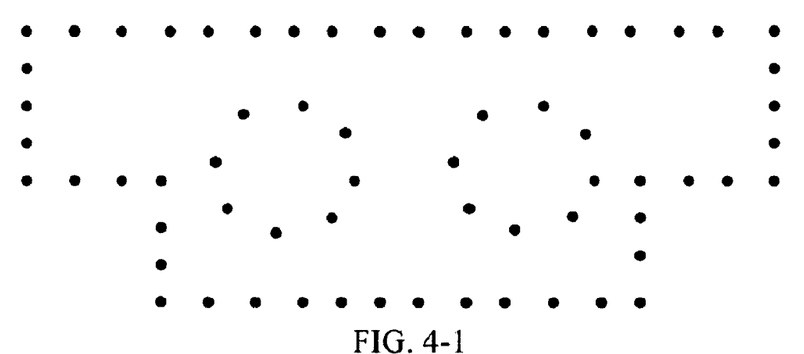
Figure 42:
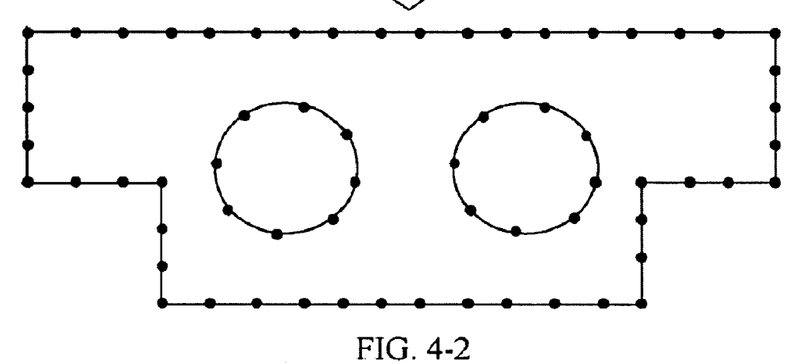

In block S306, the fitting module 27 groups the boundary points according to a vector angle between each two vectors of the boundary points, and fits each group of boundary points to an appropriate boundary characteristic, such as a circle or a beeline (details are described in FIG. 10).

In block S308, the output module 29 outputs the appropriate boundary characteristic to the storage system 24. In one embodiment, the storage system 24 is at least one of a hard disk drive, a compact disc, a digital video disc, and a tape drive. The appropriate boundary characteristic may be output and displayed on a display of the computer 2 to the user.

With reference to FIG. 4, one embodiment of fitting the boundary points to an appropriate boundary characteristic is illustrated. FIG. 4-1 illustrates an exemplary plurality of boundary points that are extracted by the boundary extracting module 25 as described in block S304, and more details of the method for extracting boundary points are described in FIG. 7. FIG. 4-2 illustrates an exemplary method of the fitting module 27 fitting the boundary points in FIG. 4-1 to beelines and circles as described in block S306, more details are shown in FIG. 10 below.

FIG. 5 is a flowchart of details of block S302 in FIG. 3. The flowchart of FIG. 5 may be used to construct a triangular mesh surface based on the point cloud data. As an example, FIG. 5 is described below with reference to FIG. 6.

In block S500, the constructing module 23 maps a grid based on the point cloud. In detail, the constructing module 23 determines a cubical figure that confines the point cloud, maps a grid on the cubical figure to obtain a plurality of grid squares, and puts the ID of each point of the point cloud into a corresponding grid square.

Figure 6:
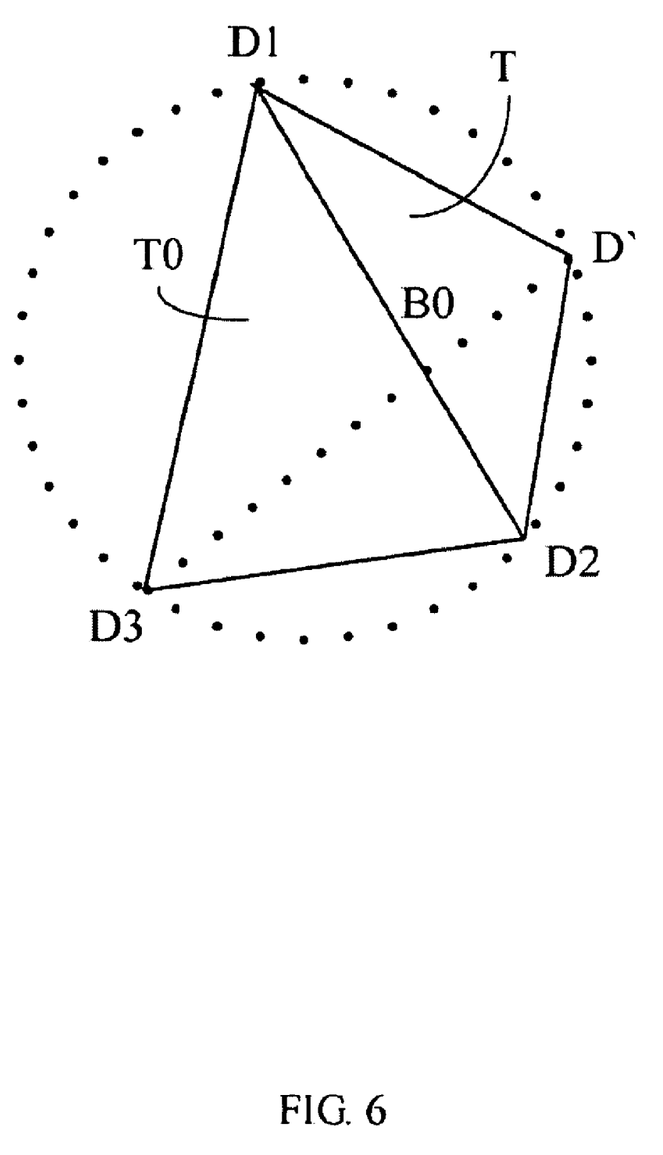
FIG. 6 is a schematic diagram illustrating one embodiment of performing a circumscribed sphere judgment and an obtuse angle judgment on a triangle to find a fourth point which can construct another triangle with an edge of the triangle.

In block S502, the constructing module 23 determines a point of the point cloud as a first point (symbolically depicted as "D1") of a triangle (symbolically depicted as "T0"), obtains grid squares surrounding the first point D1, and acquires a second point (symbolically depicted as "D2") nearest to the first point D1 in the grid squares surrounding the first point D1.

In block S504, the constructing module 23 connects the first point D1 with the second point D2 to obtain the first edge (symbolically depicted as "B0") of the triangle T0, and puts attributes of the first edge B0 into a queue. The attributes include coordinate values of two endpoints of the first edge B0 such as the coordinate values of the first point D1 and the second point D2, and an edge length of the first edge B0.

In block S506, the constructing module 23 acquires a third point (symbolically depicted as "D3") of the triangle T0 according to the maximum edge length, constructs the triangle T0 by utilizing the first point D1, the second point D2 and the third point D3, and puts attributes of the other two edges of the triangle T0 into the queue.

During constructing the triangle T0, each interior angle of the triangle T0 should not be too small, such as 1° or 2°. For example, when the constructing module 23 acquires the third point D3 to constructs the triangle T0, an angle that is larger than 25° should be first considered, and then an angle between 3° and 25° can be considered.

In block S508, the constructing module 23 performs a circumscribed sphere judgment and an obtuse angle judgment on the triangle T0 to find a fourth point (symbolically depicted as "D") which can construct another triangle with the first edge B0.

In detail, the constructing module 23 fits a circumscribed sphere based on the point D1, D2 and D3, and then makes the obtuse angle judgment on the circumscribed sphere to find the fourth point D'. The fourth point D' is formed to the circumscribed sphere, and is not within the circumscribed sphere, see the fourth point D'. The obtuse angle judgment can be described as: an angle between the triangle T0 and the triangle (symbolically depicted as "T'") constructed by the fourth point D' and the first edge B0 is must obtuse.

During the obtuse angle judgment, an angle that is equal to 120° should be first considered. If the constructing module 23 finds more than one point after the circumscribed sphere judgment and obtuse angle judgment, the constructing module 23 needs to determine one point as the fourth point D'. For example, when the constructing module 23 finds two points D1' and D2', if the point D1' and the first edge B0 are used to construct a triangle T1', and the point D2' and the first edge B0 are used to construct a triangle T2', the constructing module 23 needs to judge which opposite angle of the first edge B0 in the two triangles T1' and T2' is larger. If the opposite angle of the first edge B0 in the triangle T1' is larger than that in the triangle T2', the constructing module 23 determines that the point D1' is the fourth point D' finally found by the constructing module 23. Otherwise, if the opposite angle of the first edge B0 in the triangle T2' is larger than that in the triangle T1', the constructing module 23 determines that the point D2' is the fourth point D' finally found by the constructing module 23.

In block S510, the constructing module 23 puts attributes of edges of the another triangle constructed by the fourth point D' and the first edge B0 to the queue.

In block S512, the constructing module 23 detects whether all the triangles of the point cloud have been constructed. If any triangle of the point cloud has not been constructed, the flow may return block S508 until all the triangles have been constructed and forms the triangle mesh surface. Otherwise, if all the triangles have been constructed, the flow ends.

Figure 8:
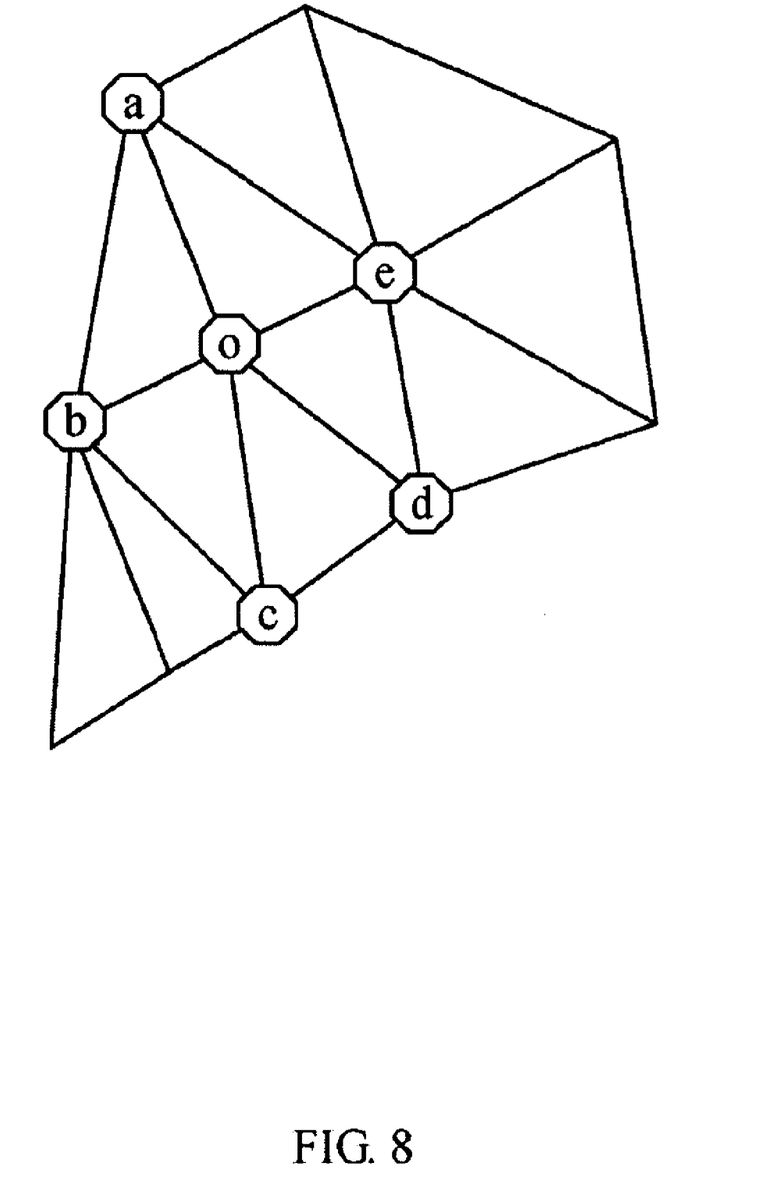
FIG. 8 and FIG. 9 are schematic diagrams illustrating one embodiment of acquiring triangles surrounding a point to be judged and obtaining points in the triangles except the point to be judged.
Figure 9:
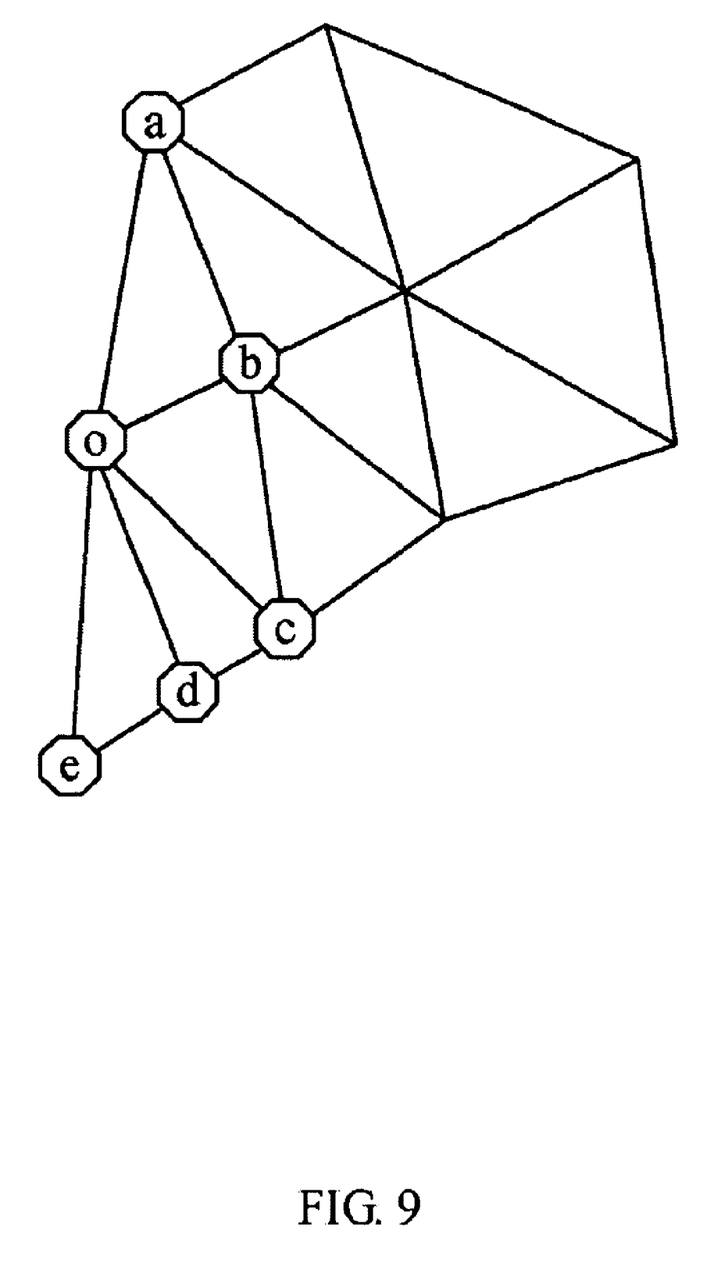

FIG. 7 is a flowchart of details of block S304 in FIG. 3. The flowchart of FIG. 7 may be used to extract boundary points of the object 3 from the triangular mesh surface. As an example, FIG. 7 is described below with reference to FIG. 8 and FIG. 9.

In block S700, the boundary extracting module 25 determines triangles that surround a point to be judged, and determines points of the triangles. In the embodiment, the point to be judged (hereinafter "judged point") is one of the points that forms the point cloud.

In block S702, the boundary extracting module 25 counts a number of triangles that connects to each of the points. See FIGS. 8 and 9, the point "o" is the judged point, points "a," "b," "c," "d" and "e" are points of the triangles surrounding the judged point "o." In FIG. 8, the boundary extracting module 25 counts the number of triangles that connects each of the five points "a"-"e." For example, the triangles surrounding the judged point "o" of FIG. 8 include triangle "aob," triangle "boc," triangle "cod," triangle "doe" and triangle "eoa," the point "a" are point of the triangles "aob" and "eoa," so the boundary extracting module 25 determines that the number of triangles surrounding the judged point "o" occupied by the point "a" is equal to two. In this example, each point "a"-"e" shares two triangles with the judged point "o." According to the method, the boundary extracting module 25 determines that each of the three points "b," "c" and "d" in FIG. 9 shares two triangles with the judged point "o," and each of the two points "a" and "e" in FIG. 9 shares one triangle with the judged point "o."

In block S704, the boundary extracting module 25 determines whether each count made in block S702 is greater than one. If each count made in block S702 is greater than one, the flow may move to block S706. Otherwise, if any count made in block S702 is less than or equal to one, the flow may move to block S708.

In block S706, the boundary extracting module 25 determines that the judged point is not a boundary point, and the flow moves to block S710. See FIG. 8, boundary extracting module 25 determines that the judged point "o" is not a boundary point, because the points "a," "b," "c," "d" and "e" each share more than one triangle with the judged point "o".

In block S708, the boundary extracting module 25 determines that the judged point is one boundary point of the object 3, and the flow moves to block S710. See in FIG. 9, the boundary extracting module 25 determines that the judged point "o" is a boundary point, because the points "a" and "e" each share one triangle with the judged point "o."

In block S710, the boundary extracting module 25 determines whether all the points in the triangle mesh surface have been judged. If any of the points has not been judged, the flow may return block S700. Otherwise, if all the points in the triangle mesh surface have been judged, the flow ends.

FIG. 10 is a flowchart of details of block S306 in FIG. 3. The flowchart of FIG. 10 may be used to group the boundary points and fit each group of boundary points to an appropriate boundary characteristic.

In block S1000, the fitting module 27 designates one of the boundary points extracted in FIG. 7 as a center point and calculates vector relationship between the central boundary point and each of the remaining boundary points.

In block S1002, the fitting module 27 groups the boundary points according to the vector relationship between the central boundary point and each of the remaining boundary points, fits each group of boundary points to a beeline, and calculates a first distance from each of the boundary points to the beeline.

In block S1004, the fitting module 27 determines whether each first distance is less than a beeline tolerance (as defined below). If each first distance from each of the boundary points to the beeline is less than the beeline tolerance, the fitting module 27 determines that the beeline is the appropriate boundary characteristic, and the flow directly ends. Otherwise, if any first distance is not less than the beeline tolerance, the flow may move to block S1006.

In block S1006, the fitting module 27 fits each group of boundary points to a circle, and calculates a second distance from each of the boundary points to the corresponding circle.

In block S1008, the fitting module 27 determines whether each second distance is less than a circle tolerance (as defined below). If each second distance is less than the circle tolerance, the flow may move to S1010. Otherwise, if any second distance is not less than the circle tolerance, the flow may end.

In block S1010, the fitting module 27 determines that the circle is the appropriate boundary characteristic, and determines whether any circles can be used to construct a cylinder if there are more than one circle that has been fitted.

If no circles can be used to construct a cylinder, the flow may end. Otherwise, if any circles can be used to construct a cylinder, in block S1010, the fitting module 27 constructs the cylinder using the circles and determines that the cylinder is one appropriate boundary characteristic.

For example, if radiuses of two circles are identical to each other, an angle between vectors of the two circles are equal to 0° or 180°, and an angle between a line connection of the two circle centers and the vectors of the two circles are also equal to 0° or 180°, the fitting module 27 determines that the two circles can construct the cylinder.

In another embodiment, the fitting module 27 may also fit each group of boundary points to the circle in block S1002, and then fit each group of boundary points to the beeline in block S1006.

In the embodiment, both the beeline tolerance and the circle tolerance may be calculated by the user in advance, and are about equal to the average value of the distances between two adjacent points of the point cloud. If point density in the point cloud is not uniform, the user can obtain the beeline tolerance and the circle tolerance by multiplying the average value of distances between points in a part of the point cloud that has high density by a coefficient such as "0.1," "0.2" or "0.3."

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A computer-implemented method for extracting boundary elements of an object, comprising:
   receiving measurement data of a point cloud of the object and a maximum edge length of a triangle to form a triangular mesh surface of the point cloud;
   constructing the triangular mesh surface of the point cloud according to the maximum edge length and the measurement data;
   extracting boundary points from the triangular mesh surface;
   grouping the boundary points according to a vector relationship between one boundary point and each of the other boundary points;
   fitting each group of boundary points to an appropriate boundary characteristic; and
   outputting the appropriate boundary characteristic to a storage system.

2. The method according to claim 1, wherein the measurement data of the point cloud comprise coordinates of each point of the object, an identification (ID) of each point of the object, and a total number of the points of the object in the point cloud.

3. The method according to claim 1, wherein the constructing block comprises:
   determining a cubical figure that confines the point cloud, mapping a grid on the cubical figure to obtain a plurality of grid squares, and putting an ID of each point of the point cloud into a corresponding grid square;
   determining a first point of a triangle in the point cloud;
   obtaining grid squares surrounding the first point, and acquiring a second point of the triangle nearest to the first point in the grid squares surrounding the first point;
   connecting the first point with the second point to obtain a first edge of the triangle and putting attributes of the first edge into a queue;
   acquiring a third point of the triangle according to the maximum edge length, constructing the triangle utilizing the first point, the second point and the third point, and putting attributes of the other two edges of the triangle into the queue;
   performing a circumscribed sphere judgment and an obtuse angle judgment on the triangle to find a fourth point to construct another triangle with the first edge;
   putting attributes of edges of the another triangle constructed by the fourth point and the first edge into the queue;
   determining whether all the triangles of the point cloud have been constructed;
   repeating the blocks from the performing block to the putting block if any of the triangles of the point cloud is not constructed; and forming the triangle mesh surface using all the triangles of the point cloud.

4. The method according to claim 1, wherein the extracting block comprises:
   (a) determining triangles that surround a point to be judged and determining points of the triangles;
   (b) counting a number of triangles that connects to each of the points;
   (c) determining whether each count is greater than one;
   (d) determining that the point to be judged is not a boundary point if each count is greater than one, or determining that the point to be judged is the boundary point of the object if any count is less than or equal to one; and
   (e) repeating block (a) to block (d) for each point in the triangle mesh surface.

5. The method according to claim 1, wherein the fitting block comprises:
   fitting each group of boundary points to a first boundary characteristic, and calculating a first distance from each of the boundary points to the first boundary characteristic;
   determining that the first boundary characteristic is the appropriate boundary characteristic if each first distance is less than a first tolerance, or fitting the each group of boundary points to a second boundary characteristic and calculating a second distance from each of the boundary points to a second boundary characteristic if any first distance is not less than the first tolerance;
   in response to the second distance is not less than the second tolerance, going the outputting block, or determining that the second boundary characteristic is the appropriate boundary characteristic if each second distance is less than the second tolerance;
   determining whether the appropriate boundary characteristic can be used to construct a cylinder; and
   in response to no appropriate boundary characteristics can be used to construct the cylinder, going to the outputting block, or constructing the cylinder and determining that the cylinder is one appropriate boundary characteristic if the appropriate boundary characteristics can be used to construct the cylinder.

6. The method according to claim 5, wherein the first boundary characteristic is a beeline, the second boundary characteristic is a circle, the first tolerance is a beeline tolerance, and the second tolerance is a circle tolerance.

7. The method according to claim 5, wherein the first boundary characteristic is a circle, the second boundary characteristic is a beeline, the first tolerance is a circle tolerance, and the second tolerance is a beeline tolerance.

8. A system for extracting boundary elements of an object, comprising:
   a receiving module configured for receiving measurement data of a point cloud of the object and a maximum edge length of a triangle to form a triangular mesh surface of the point cloud;
   a constructing module configured for constructing the triangular mesh surface of the point cloud according to the maximum edge length and the measurement data;
   a boundary extracting module configured for extracting boundary points from the triangular mesh surface;
   a fitting module configured for grouping the boundary points according to a vector relationship between one boundary point and each of the other boundary points, and fitting each group of boundary points to an appropriate boundary characteristic; and
   an outputting module configured for outputting the appropriate boundary characteristic to a storage system.

9. The system according to claim 8, wherein the boundary extracting module extracts the boundary points from the triangular mesh surface by the following blocks:
   determining triangles that surround a point to be judged and determining points of the triangles;
   counting a number of triangles that connects to each of the points;
   determining whether each count is greater than one; and
   determining that the point to be judged is not a boundary point if each count is greater than one, or determining that the point to be judged is the boundary point of the object if any count is less than or equal to one.

10. The system according to claim 8, wherein the fitting module fits each group of the boundary points to the appropriate boundary characteristic by the following blocks:
    fitting each group of boundary points to a first boundary characteristic, and calculating a first distance from each of the boundary points to the first boundary characteristic;
    determining that the first boundary characteristic is the appropriate boundary characteristic if each first distance is less than a first tolerance, or fitting the each group of boundary points to a second boundary characteristic and calculating a second distance from each of the boundary points to a second boundary characteristic if any first distance is not less than the first tolerance;
    in response to the second distance is not less than the second tolerance, going the outputting block, or determining that the second boundary characteristic is the appropriate boundary characteristic if each second distance is less than the second tolerance;
    determining whether the appropriate boundary characteristic can be used to construct a cylinder; and
    in response to no appropriate boundary characteristics can be used to construct the cylinder, going to the outputting block, or constructing the cylinder and determining that the cylinder is one appropriate boundary characteristic if the appropriate boundary characteristics can be used to construct the cylinder.

11. The system according to claim 10, wherein the first boundary characteristic is a beeline, the second boundary characteristic is a circle, the first tolerance is a beeline tolerance, and the second tolerance is a circle tolerance.

12. The system according to claim 10, wherein the first boundary characteristic is a circle, the second boundary characteristic is a beeline, the first tolerance is a circle tolerance, and the second tolerance is a beeline tolerance.

13. The system according to claim 8, wherein the storage system is at least one of a hard disk drive, a compact disc, a digital video disc, and a tape drive.

14. A non-transitory computer-readable medium having stored thereon instructions for extracting boundary elements of an object, the non-transitory computer-readable medium, when executed by a computer, causing the computer to perform a method, the method comprising:
    receiving measurement data of a point cloud of the object and a maximum edge length of a triangle to form a triangular mesh surface of the point cloud;
    constructing the triangular mesh surface of the point cloud according to the maximum edge length and the measurement data;
    extracting boundary points from the triangular mesh surface;
    grouping the boundary points according to a vector relationship between one boundary point and each of the other boundary points;

fitting each group of boundary points to an appropriate boundary characteristic; and outputting the appropriate boundary characteristic to a storage system.

15. The medium according to claim 14, wherein the constructing block comprises:

determining a cubical figure that confines the point cloud, mapping a grid on the cubical figure to obtain a plurality of grid squares, and putting an ID of each point of the point cloud into a corresponding grid square;

determining a first point of a triangle in the point cloud;

obtaining grid squares surrounding the first point, and acquiring a second point of the triangle nearest to the first point in the grid squares surrounding the first point;

connecting the first point with the second point to obtain a first edge of the triangle and putting attributes of the first edge into a queue;

acquiring a third point of the triangle according to the maximum edge length, constructing the triangle utilizing the first point, the second point and the third point, and putting attributes of the other two edges of the triangle into the queue;

performing a circumscribed sphere judgment and an obtuse angle judgment on the triangle to find a fourth point to construct another triangle with the first edge;

putting attributes of edges of the another triangle constructed by the fourth point and the first edge into the queue;

determining whether all the triangles of the point cloud have been constructed;

repeating the blocks from the performing block to the putting block if any of the triangles of the point cloud is not constructed; and forming the triangle mesh surface using all the triangles of the point cloud.

16. The medium according to claim 14, wherein the extracting block comprises:

(a) determining triangles that surround a point to be judged and determining points of the triangles;

(b) counting a number of triangles that connects to each of the points;

(c) determining whether each count is greater than one;

(d) determining that the point to be judged is not a boundary point if each count is greater than one, or determining that the point to be judged is the boundary point of the object if any count is less than or equal to one; and (e) repeating block (a) to block (d) for each point in the triangle mesh surface.

17. The medium according to claim 14, wherein the fitting block comprises:

fitting each group of boundary points to a first boundary characteristic, and calculating a first distance from each of the boundary points to the first boundary characteristic;

determining that the first boundary characteristic is the appropriate boundary characteristic if each first distance is less than a first tolerance, or fitting the each group of boundary points to a second boundary characteristic and calculating a second distance from each of the boundary points to a second boundary characteristic if any first distance is not less than the first tolerance;

in response to the second distance is not less than the second tolerance, going the outputting block, or determining that the second boundary characteristic is the appropriate boundary characteristic if each second distance is less than the second tolerance;

determining whether the appropriate boundary characteristic can be used to construct a cylinder; and in response to no appropriate boundary characteristics can be used to construct the cylinder, going to the outputting block, or constructing the cylinder and determining that the cylinder is one appropriate boundary characteristic if the appropriate boundary characteristics can be used to construct the cylinder.

18. The medium according to claim 17, wherein the first boundary characteristic is a beeline, the second boundary characteristic is a circle, the first tolerance is a beeline tolerance, and the second tolerance is a circle tolerance.

19. The medium according to claim 17, wherein the first boundary characteristic is a circle, the second boundary characteristic is a beeline, the first tolerance is a circle tolerance, and the second tolerance is a beeline tolerance.

20. The medium according to claim 14, wherein the storage system is at least one of a hard disk drive, a compact disc, a digital video disc, and a tape drive.

* * * * *